United States Patent [19]
Nakazawa et al.

[11] Patent Number: 5,751,406
[45] Date of Patent: May 12, 1998

[54] RANGE FINDING APPARATUS

[75] Inventors: Fumihiko Nakazawa; Hitoshi Okumura; Satoshi Sano; Fumitaka Abe, all of Kawasaki, Japan

[73] Assignee: Fujitsu Limited, Kawasaki, Japan

[21] Appl. No.: 560,987

[22] Filed: Nov. 20, 1995

[30] Foreign Application Priority Data

| Nov. 22, 1994 | [JP] | Japan | 6-287691 |
| Apr. 26, 1995 | [JP] | Japan | 7-102275 |
| Sep. 14, 1995 | [JP] | Japan | 7-236398 |

[51] Int. Cl.$^6$ .................. G01C 3/00; G03B 13/00
[52] U.S. Cl. ............ 356/3.03; 250/201.6; 356/3.06; 356/3.07; 396/109
[58] Field of Search .............. 396/109; 250/201.6; 356/3.03, 3.06, 3.07

[56] References Cited

U.S. PATENT DOCUMENTS

| 4,868,593 | 9/1989 | Takamura et al. |  |
| 4,875,777 | 10/1989 | Harding | 356/376 |
| 5,125,735 | 6/1992 | Oizumi et al. | 250/201.6 |
| 5,239,335 | 8/1993 | Kato | 250/201.4 |
| 5,257,060 | 10/1993 | Kotani et al. |  |

FOREIGN PATENT DOCUMENTS 63-282611  11/1988  Japan.

*Primary Examiner*—Stephen C. Buczinski
*Attorney, Agent, or Firm*—Armstrong, Westerman, Hattori, McLeland, & Naughton

[57] ABSTRACT

A range finding apparatus includes; M photoprojectors (M: greater than one) provided in one-to-one correspondence with M range-finding axes radially extending within a virtual plane for forwardly projecting detection light along the range-finding axes; a photodetector spaced apart from the virtual plane and having N light detecting portions (N: greater than one), which serves as common photoelectric conversion means for the M photoprojectors; a range-finding axis switching device for selectively allowing the M photoprojectors to emit light; and a distance determination device for determining a distance to an object on the basis of detection values output from the N light detecting portions.

17 Claims, 14 Drawing Sheets

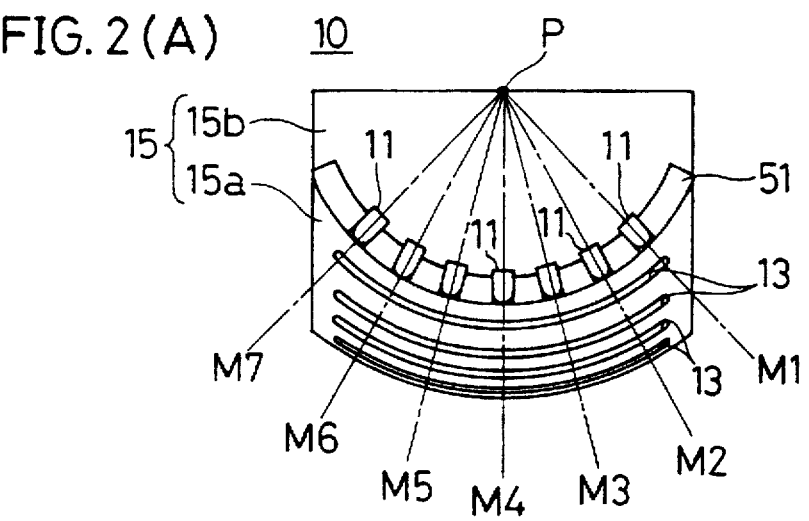
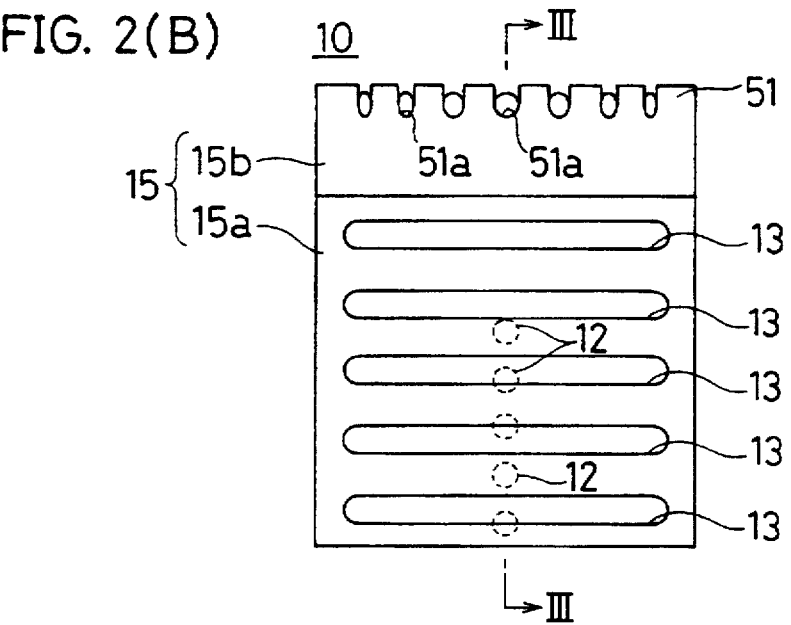

REFLECTANCE ρ : 90%

REFLECTANCE ρ : 18%

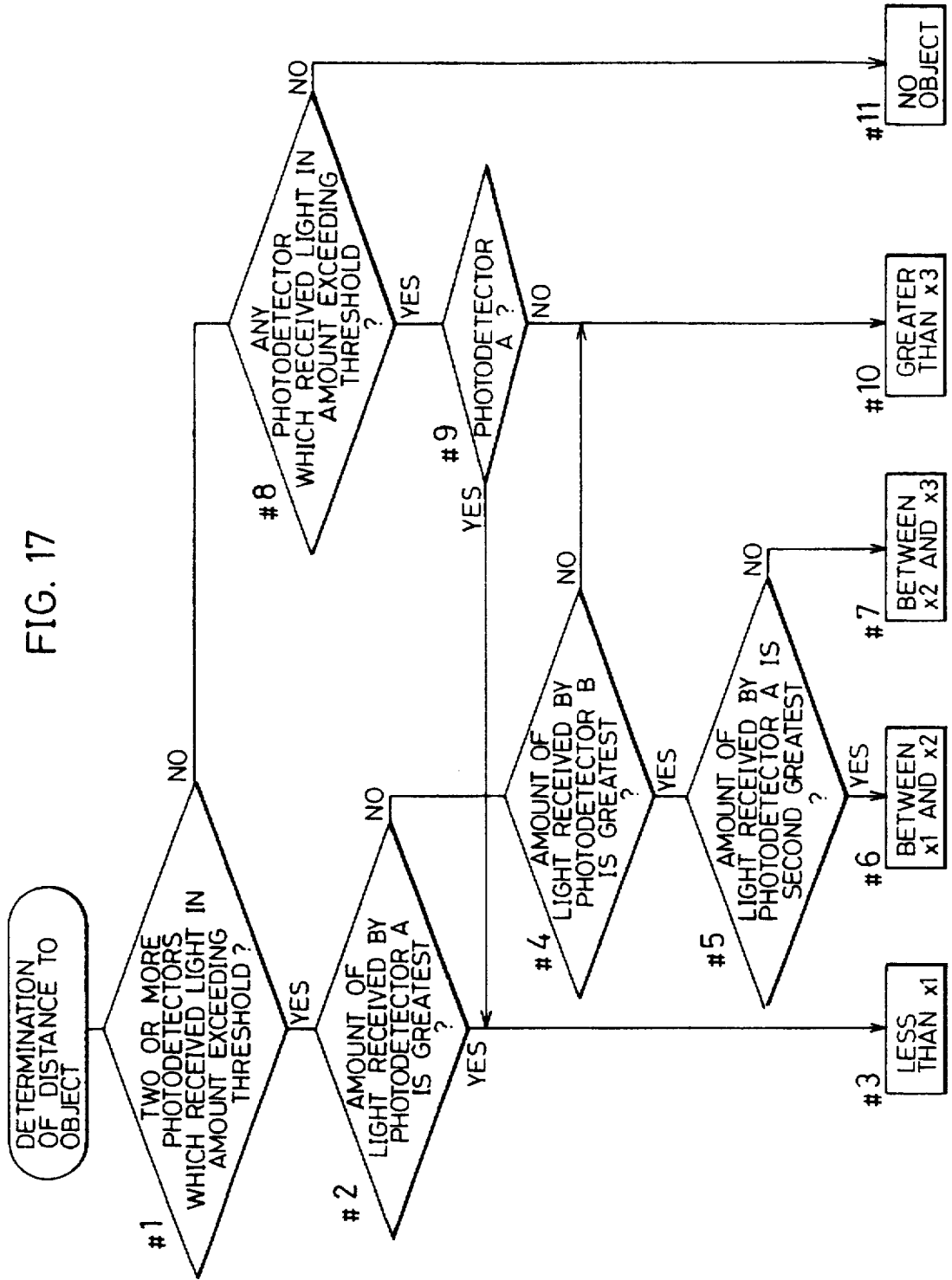

5,751,406

1

RANGE FINDING APPARATUS

BACKGROUND OF THE INVENTION

1. Field of the Invention

The present invention relates to a range finding apparatus for measuring a distance to an object, which is used as a vision sensor when a computer recognizes objects in an outside environment.

2. Description of Related Art

As personal computers are now widely used and penetrate into our daily life, usability and familiarity are important factors required for computer systems. Visual sensors are human interfaces indispensable for communications between computers and human beings. To this end, it has been desired to provide a visual sensor which is less expensive and suitable for personal use.

Trigonometrical range finders are widely used as range finding means for autofocus cameras, which are adapted to measure an angular offset of a light reception axis with respect to a light emission axis. Range finders of this type generally have infrared light emitting elements and a position sensitive device, and are adapted to emit and receive modulated infrared light to prevent erroneous range finding.

A range finder disclosed in Japanese Unexamined Patent Publication No. 63-282611 (1988) has light emitting elements for long range finding and for short range finding, which are switched so that the amount of received light can be accommodated in an optimum range to improve the range finding accuracy.

Industrial robots also use trigonometrical range finders along with cameras as visual sensors. Since a range-finding field (or visual field) covered by a single range finder is limited, mobile robots, in particular, are provided with a plurality of range finders which are adapted to emit light in different directions (or along different range finding axes) to expand the range-finding field. These range finders are simultaneously or successively driven to detect an obstacle or target.

The aforesaid method for expanding the range-finding field by the proper arrangement of a plurality of range finders is more advantageous than a method for expanding the range-finding field by the scanning of a range finder itself or a range-finding beam in terms of reliability and maintenance facilitation. This is because the former method dispenses with a dynamic mechanism.

To expand the range-finding field of a visual sensor or to improve range-finding resolution by subdividing the rangefinding field, the numbers of light emitting elements and light receiving elements paired therewith are increased, thereby increasing the total number of components of the visual sensors. Particularly where detection light is to be modulated, increased numbers of modulation circuits and light receiving circuits for extracting the modulated light are required. This may result in a complicated construction and a remarkably cost increase.

SUMMARY OF THE INVENTION

In view of the foregoing, it is an object of the present invention to realize the measurement of a distance to an object in a two-dimensional field by using a range finding apparatus with a minimum number of components.

In accordance with the present invention, there is provided a range finding apparatus comprising: M photoprojectors (M: greater than one) provided in one-to-one correspondence with M range finding axes radially extending within

2 a virtual plane for forwardly projecting detection light along the respective range finding axes; a photodetector spaced apart from the virtual plane and having N light detecting portions (N: greater than one), which serves as common photoelectric conversion means for the M photoprojectors; range-finding axis switching means for selectively allowing the M photoprojectors to emit light; and distance determination means for determining a distance to an object based on detection values output from the N light detecting portions.

Exemplary photoprojectors include a light emitting diode and laser diode used in combination with a lens.

The photodetector having the N light detecting portions (N>2) may include N phototransistors or photodiodes or, alternatively, may be a position detective device or line sensor (one-dimensional CCD) having a plurality of light detecting elements.

Where the light detecting portions each have a wide visual field (wide range of directivity), light reception field limitation means such as a slit is preferably provided to appropriately limit the visual field.

Where the light reception fields of the respective light detecting portions do not overlap each other, the distance determination means determines the distance on the basis of which of the N light detecting portions has received the emitted light.

On the other hand, where some of the light reception fields of the respective light detecting portions overlap, the distance determination means compares the detection values output from the N light detecting portions with each other to determine the distance on the basis of the comparative relation among the detection values.

The range-finding axis switching means for selectively allowing the M photoprojectors to emit light and the distance determination means may be integrated in a microcomputer comprising a CPU, a ROM and a RAM.

BRIEF DESCRIPTION OF THE DRAWINGS

FIG. 2(A) is a top plan view illustrating an optical system of the range finding apparatus according to the first embodiment;

FIG. 2(B) is a front view illustrating the optical system of the range finding apparatus according to the first embodiment;

FIG. 17 is a flow chart for illustrating the method for determining an object distance in accordance with the fourth embodiment;

DETAILED DESCRIPTION OF THE PREFERRED EMBODIMENTS

Figure 1:
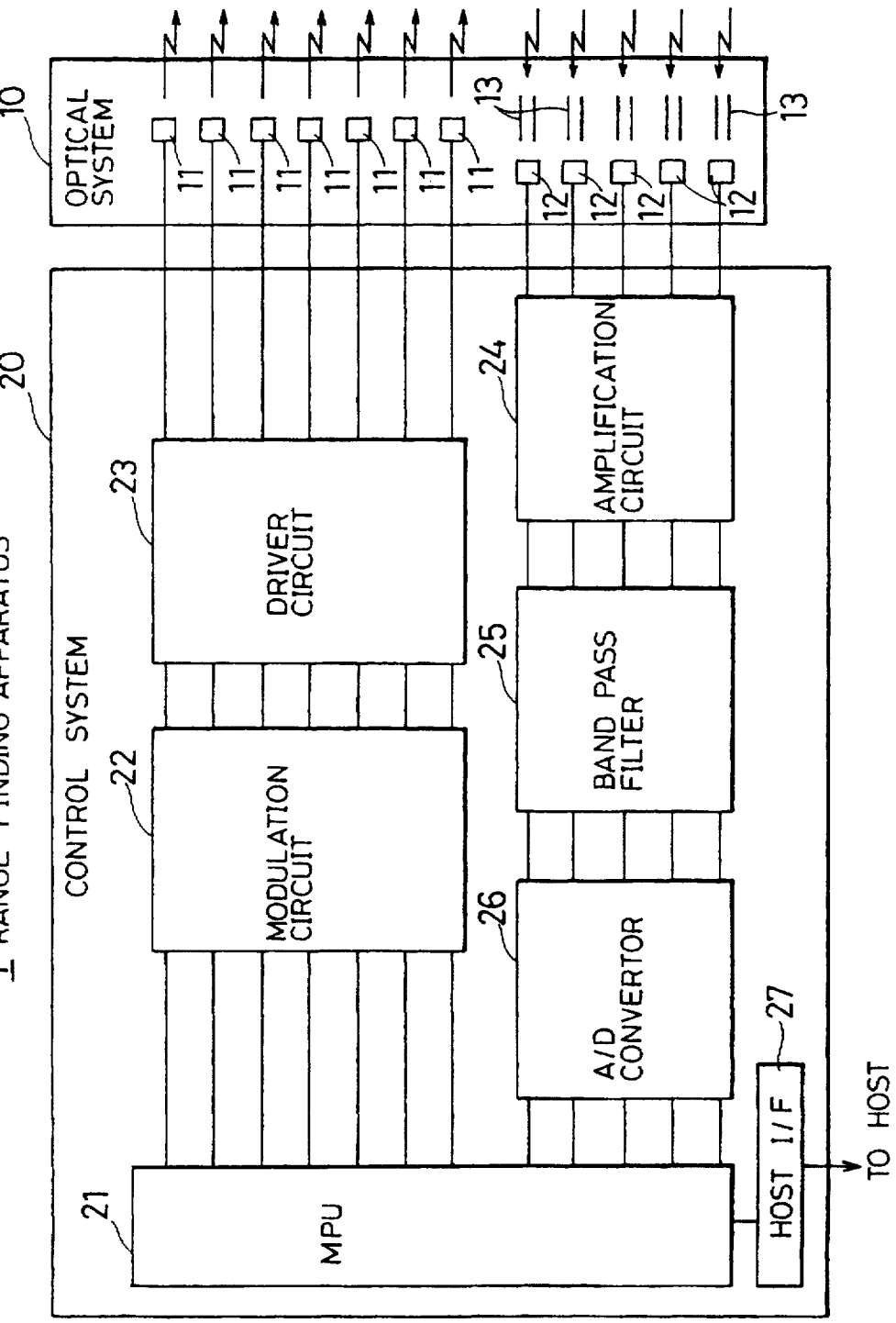
FIG. 1 is a block diagram illustrating the functional construction of a range finding apparatus in accordance with a first embodiment of the present invention.

FIG. 1 is a block diagram illustrating the functional construction of a range finding apparatus 1 in accordance with a first embodiment of the present invention.

The range finding apparatus 1 includes an optical system 10 for emitting detection light and outputting a photoelectric signal in accordance with a distance to an object, and a control system 20 for controlling light projection of the optical system 10 and processing the photoelectric signal. The range finding apparatus 1 is used, for example, as visual information inputting means for an object recognition system.

The optical system 10 has seven photoprojectors 11, five photodetectors 12, and slits 13 serving as optical means for limiting the light reception field of the respective photodetectors 12. The photoprojectors 11 each comprise an infrared light emitting diode and a condenser lens. The photodetectors 12 each comprise a focusing lens and a phototransistor.

The control system 20 includes a microprocessor unit (MPU) 21 functioning as range-finding axis switching means, a modulation circuit 22 for flashing the detection light at a frequency of about 40 kHz, a driver circuit 23 for supplying driving current to the respective photoprojectors 11, an amplification circuit 24 for amplifying an output (receivedlight signal) of each of the photodetectors 12, a band-pass filter 25 for extracting a modulated component corresponding to the detection light from the amplified received-light signal, an A/D convertor 26 for quantifying the extracted modulated component, and a host interface 27 for sending a range finding result to external visual information processing means (host) such as a personal computer.

The MPU 21, the construction of which is not shown, comprises a CPU for running programs, an ROM storing therein the programs and data for arithmetic processing, an RAM for providing a work area for program implementation, and I/O ports.

Figure 3:
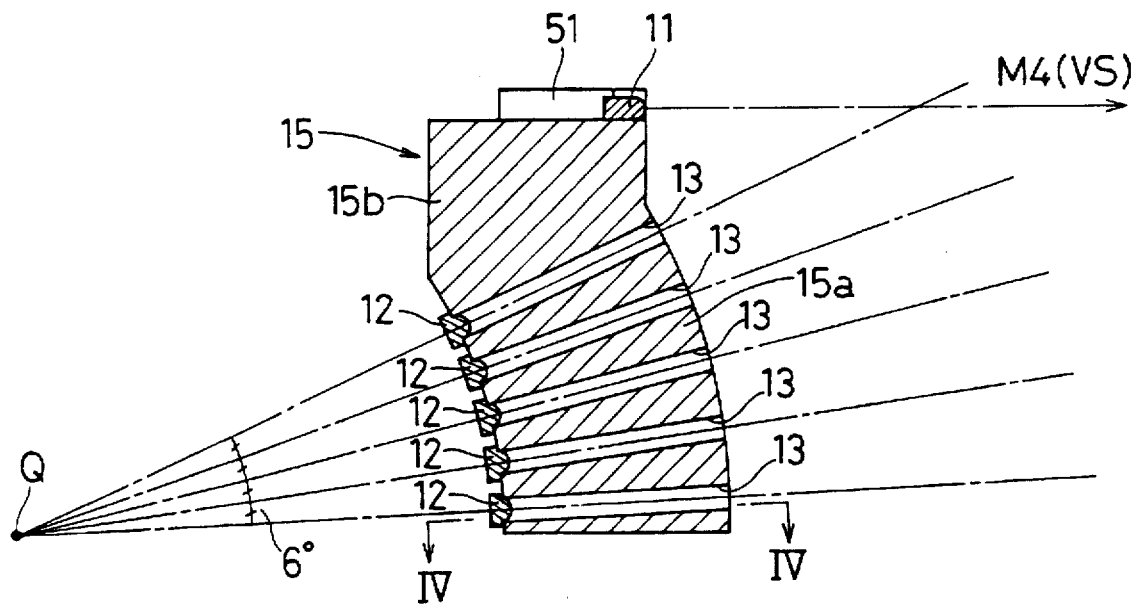
FIG. 3 is an arrow sectional view taken along a line III—III of FIG. 2(B)
Figure 4:
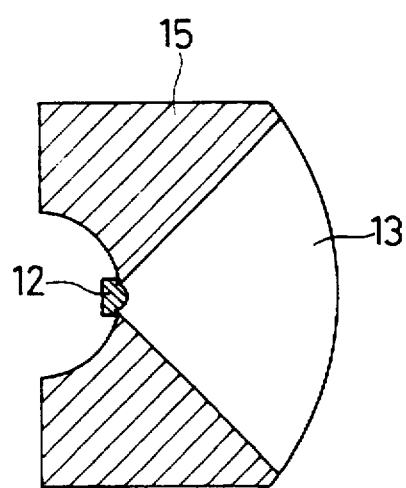
FIG. 4 is an arrow sectional view taken along a line IV—IV of FIG. 3.

FIG. 2 shows the appearance of the optical system 10 (FIGS. 2(A) and 2(B) are a plan view and front view, respectively, of the optical system 10). FIG. 3 is an arrow sectional view taken along a line III—III of FIG. 2. FIG. 4 is an arrow sectional view taken along a line IV—IV of FIG. 3. FIG. 5 is a diagram for explaining the principle of the range finding to be performed by the optical system 10.

The optical system 10 has a block 15 as a base body, which is made of a black resin. The block 15 has a spherical lower block 15a formed with five slits 13 and a semicylindrical upper block 15b, which are integrally molded as one piece.

On the upper face of the upper block 15b is disposed an arcuate wall portion 51 having seven guide grooves 51a, in which the photoprojectors 11 are respectively fitted for positioning thereof. As shown in FIGS. 2(A) and 5, the respective photoprojectors 11 are provided in one-to-one correspondence with seven range-finding axes M1 to M7 spaced, for example, at intervals of 15° and radially extending with respect to a virtual view point P within a virtual plane VS, and adapted to emit infrared light (detection light) along the range-finding axes M1 to M7. More specifically, the guide grooves 51a are formed so that the optical axes of the respective photoprojectors 11 coincide with the range-finding axes M1 to M7.

As shown in FIG. 3, the five slits 13 are respectively formed along five axes spaced, for example, at intervals of 6° and radially extending with respect to a virtual point Q in the lower block 15a.

As shown in FIG. 4, the slits 13 are each formed into a flat cavity having a fan shape in plan view and laterally extending from the rear side to the front side of the block 15. The photodetectors 12 are respectively disposed at the rear ends of the slits 13 (i.e., the centers of the fans). The central angle of each of the fan-shaped slits 13 is such that the photodetectors 12 can receive the detection light reflected on the object in a range-finding field extending forwardly of the respective photoprojectors 11 along the seven range-finding axes M1 to M7.

More specifically, the five photodetectors 12 which serve as common photoelectric conversion means for the seven photoprojectors 11, are aligned in a plane perpendicular to the virtual plane VS (for example, in a vertical plane if the virtual plane VS is horizontal) and spaced apart from the virtual plane VS. The light reception fields of the respective photodetectors 12 are limited by inclining the respective slits 13 at different angles with respect to the virtual plane VS, so that the detection light reflected at different points in the range-finding field extending forward along the range-finding axes M1 to M7 is selectively received by different photodetectors 12 depending on the reflection points.

There will next be explained the principle of the range finding to be performed by the optical system 10 along with the operation of the control system 20.

Figure 5A:
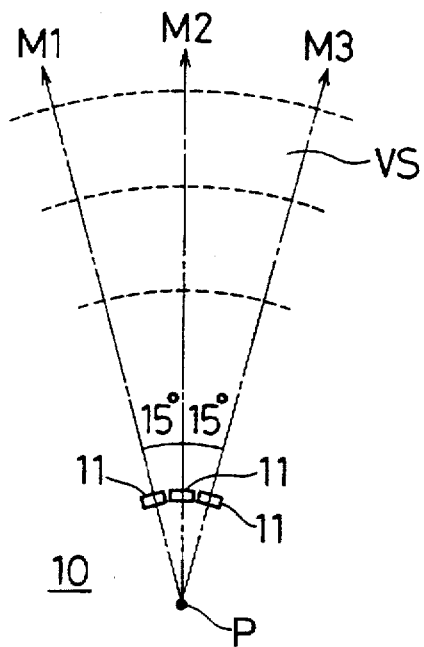
FIGS. 5(A) and 5(B) are diagrams for explaining the principle of the range finding to be performed by the optical system according to the first embodiment.

Referring to FIG. 5(A), the photoprojectors 11 are disposed radially with respect to the virtual view point P as described above. Though only three range-finding axes M1 to M3 are shown in FIG. 5(A), the optical system 10 has seven range-finding axes M1 to M7 spaced at intervals of 15° in accordance with this embodiment. Therefore, the range-finding field (view field) of the optical system 10 is a two-dimensional area of a fan shape having a central angle of 90° (15°×6°).

The MPU 21 in the control system 20 successively selects the seven photoprojectors 11 one by one and allows the respective photoprojectors 11 to emit detection light along the range-finding axes M1 to M7 in a time-divisional manner. If there exists an object on the range-finding axes M1 to M7 or the optical axes of the photoprojectors 11, the detection light is irregularly reflected on the surface of the object, and some of the reflected light returns to the side of the photodetectors 12.

Figure 5B:
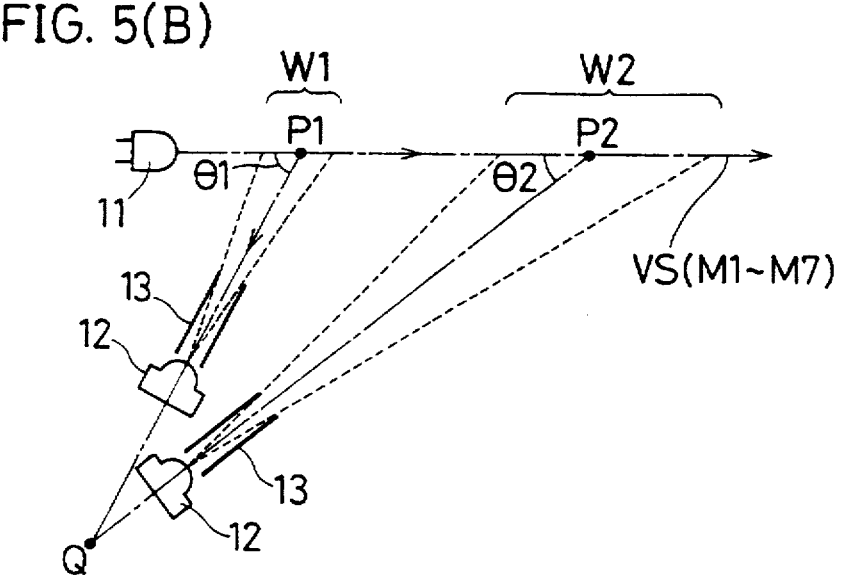

As shown in FIG. 5(B), the photodetectors 12 are spaced apart from the virtual plane VS (including the optical axes of the photoprojectors 11), and the light reception fields thereof are limited by the slits 13. Therefore, the detection light reflected at a position within a predetermined field w1 including a point P1 on the optical axis of the photoprojector 11, for example, enters one photodetector 12. The detection light reflected at a position within a predetermined field w2 including a point P2 more remote from the photoprojector 11 than the point P1 enters another photodetector 12.

Therefore, the distance to the object can be determined on the basis of which of the five photodetectors 12 detects the detection light, while the azimuth of the object can be determined on the basis of which of the seven photoprojectors 11 is selected to be allowed to emit light at this time.

The MPU 21 takes in five detection data corresponding to the respective photodetectors 12 which are output from the A/D convertor 26 to calculate the distance to the object. The calculation result is sent to the host via the host interface 27 along with data indicative of a range-finding direction. This process sequence is repeated, for example, in a cycle of 100 ms. The host recognizes the movement of the object on the basis of data successively input from the MPU 21.

Referring to FIG. 5(B), if the optical and dimensional conditions of the respective slits 13 are the same, the cross angle (θ1, θ2) between the incident light axis of a photodetector 12 and the virtual plane VS becomes smaller, as the distance between a particular photoprojector 11 and the object becomes greater. Therefore, the field (w1, w2) of the photodetector 12 becomes larger, as the distance between the photoprojector 11 and the object becomes greater. Since the detection light emitted by each of the photoprojectors 11 is not a parallel beam but diverges with the distance from the photoprojector 11, the amount of the reflected light at the point P2 is smaller than that at the point P1. The respective photodetectors 12 receive different amounts of incident light. However, the detection conditions can easily be made consistent regardless of the positions of the respective photodetectors 12 by appropriately setting the optical and dimensional conditions of the slits 13, photoelectric signal amplification factor and the like.

Figure 6:
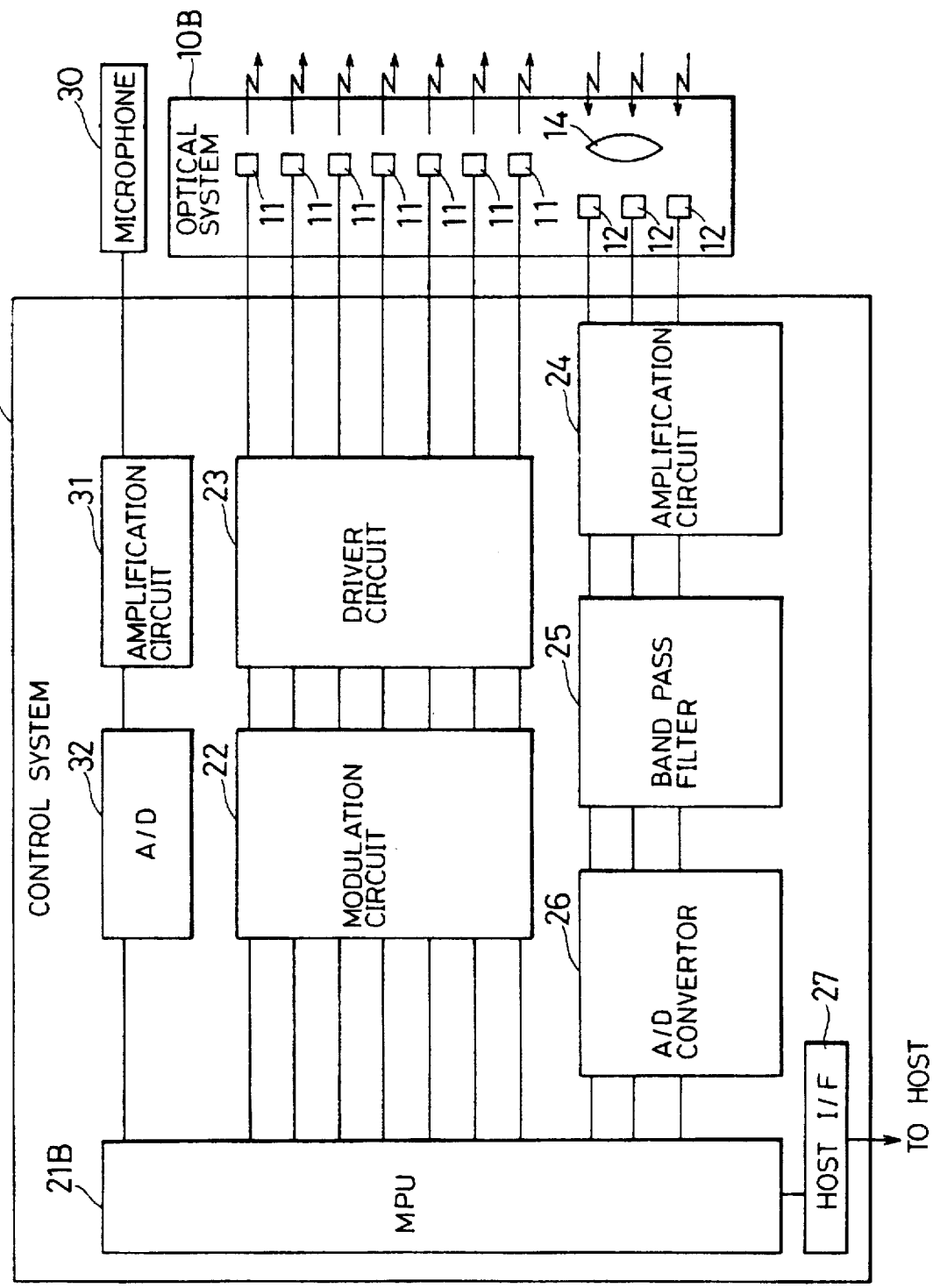
FIG. 6 is a block diagram illustrating the functional construction of a range finding apparatus in accordance with a second embodiment of the present invention.

FIG. 6 is a block diagram illustrating the functional construction of a range finding apparatus 2 in accordance with a second embodiment. In FIG. 6 and subsequent figures, components having the same functions as those shown in FIGS. 1 to 5 are designated by the same reference numerals.

The range finding apparatus 2 comprises an optical system 10B, a control system 20B, and a microphone 30 serving as voice detection means. The range finding apparatus 2 is used, for example, as visual and audio information inputting means for an object recognition system. The microphone 30 is provided to increase the practicality of the object recognition by allowing the range finding apparatus 2 to judge if an object approaching the range-finding apparatus 2 makes voice like human beings.

The optical system 10B includes seven photoprojectors 11, three photodetectors 12, and lenses 14 serving as optical means for limiting light reception fields of the respective photodetectors 12. The photoprojectors 11 each comprise an infrared light emitting diode and a condenser lens. The photodetectors 12 each comprise a phototransistor.

The control system 20B includes an MPU 21B functioning as range-finding axis switching means, a modulation circuit 22 for flashing detection light, a driver circuit 23 for supplying driving current to the respective photoprojectors 11, an amplification circuit 24 for amplifying a receivedlight signal from each of the photodetectors 12, a band-pass filter 25 for extracting a modulated component corresponding to the detection light from the amplified received-light signal, an A/D convertor 26 for quantifying the extracted modulated component, an amplification circuit 31 for amplifying an output (voice signal) of the microphone 30, an A/D convertor 32 for quantifying the amplified voice signal, and a host interface 27 for sending a range-finding result to external information processing means (host) such as a personal computer.

Figure 7A:
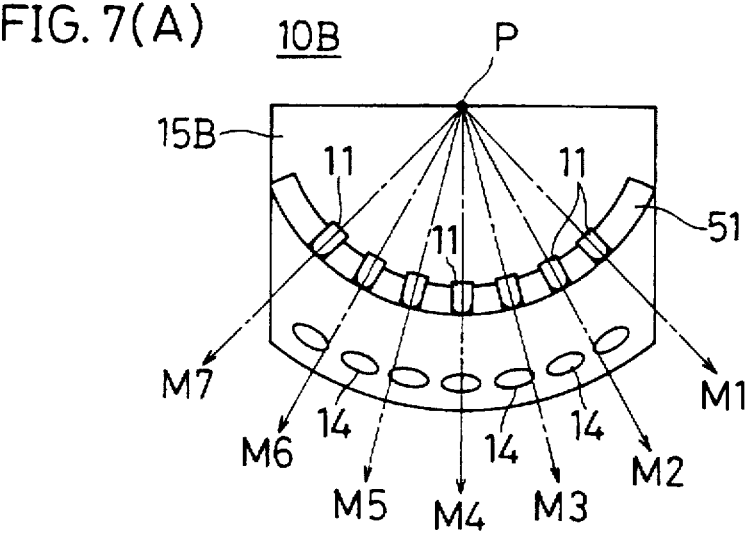
FIG. 7(A) is a top plan view illustrating an optical system of FIG. 6.
Figure 7B:
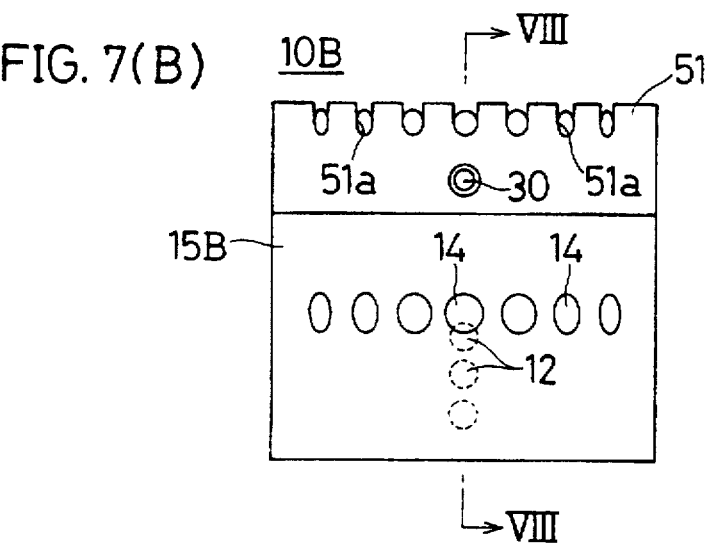
FIG. 7(B) is a front view illustrating the optical system of FIG. 6.
Figure 8:
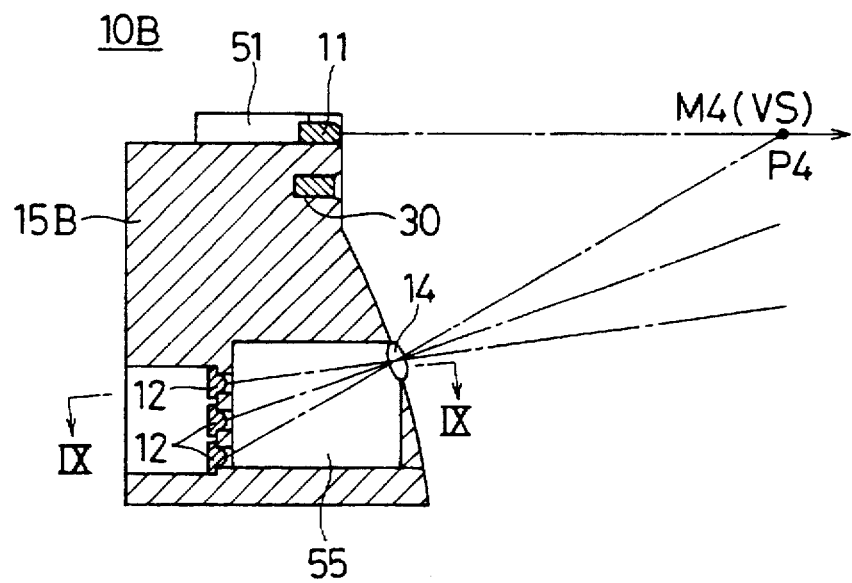
FIG. 8 is an arrow sectional view taken along a line VIII—VIII of FIG. 7(B)

FIG. 7 shows the appearance of the optical system 10B (FIGS. 7(A) and 7(B) are a plan view and a front view, respectively, of the optical system 10B). FIG. 8 is an arrow sectional view taken along a line VIII—VIII of FIG. 7(B), and FIG. 9 is an arrow sectional view taken along a line IX—IX of FIG. 8.

The optical system 10B has, as a base body, a generally semi-cylindrical block 15B with the front lower portion thereof bulging. On the upper face of the block 15B is disposed an arcuate wall portion 51 having seven guide grooves 51a, in which the photoprojectors 11 are respectively fitted for positioning thereof. As shown in FIG. 7(A), the respective photoprojectors 11 are provided in one-to-one correspondence with seven range-finding axes M1 to M7 spaced, for example, at intervals of 15° and radially extending with respect to a virtual view point P within a plane, and adapted to emit infrared light (detection light) along the respective range-finding axes M1 to M7.

Figure 9:
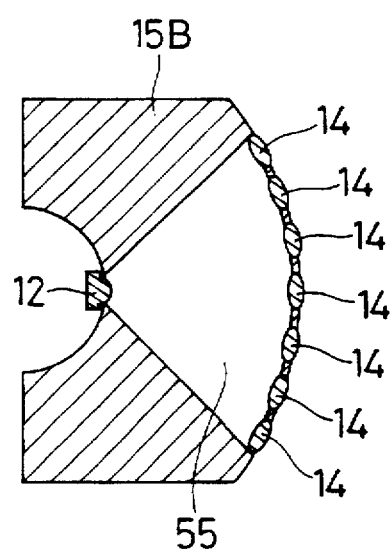
FIG. 9 is an arrow sectional view taken along a line IX—IX of FIG. 8.

As shown in FIG. 9, the block 15B has a cavity 55 formed into a fan shape in plan view and laterally extending from the rear side to the front side of a lower portion thereof. The three photodetectors 12 are vertically aligned along the rear edge of the cavity 55 (along the center edge of the fan-shaped cavity). The central angle of the fan-shaped cavity 55 is such that the photodetectors 12 can receive the detection light reflected on the object in a range-finding field extending forwardly of the respective photoprojectors 11 along the seven rangefinding axes M1 to M7. More specifically, the three photodetectors 12, which serve as common photoelectric conversion means for the seven photoprojectors 11, are disposed in a plane perpendicular to a virtual plane VS and including the range-finding axis M4, and spaced apart from the virtual plane VS.

Seven lenses 14 are radially provided in a plane parallel to the virtual plane VS in the front upper portion of the cavity 55. The light reception fields of the respective photodetectors 12 are limited by the lenses 14 so that the detection light reflected at different points in the rangefinding field extending forward along the range-finding axes M1 to M7 is selectively received by different photodetectors 12 depending on the reflection points.

In the range-finding apparatus 2, like the aforesaid range-finding apparatus 1, the MPU 21 in the control system 20B successively selects the seven photoprojectors 11 one by one and allows the respective photoprojectors 11 to emit light along the range-finding axes M1 to M7 in a time-divisional manner. If there exists an object on the range-finding axes M1 to M7 or the optical axes of the photoprojectors 11, the detection light is irregularly reflected on the surface of the object, and some of the reflected light returns to the side of the photodetectors 12.

The photodetectors 12 are spaced apart from the virtual plane VS, and the light reception fields thereof are limited by the lenses 14. Therefore, the detection light reflected at a point P4 located relatively close to a photoprojector 11 on the optical axis of the photoprojector 11, for example, enters a photodetector 12 at the lowermost position. On the other hand, the detection light reflected at a position more remote from the photoprojector 11 than the point P4 enters a photodetector 12 at the middle position, and the detection light reflected at a position still more remote from the photoprojector 11 enters a photodetector 12 at the uppermost position.

Therefore, the distance to the object can be determined on the basis of which of the three photodetectors 12 detects the detection light, while the azimuth of the object can be determined on the basis of which of the seven photoprojectors 12 is selected to be allowed to emit light at this time.

Figure 10:
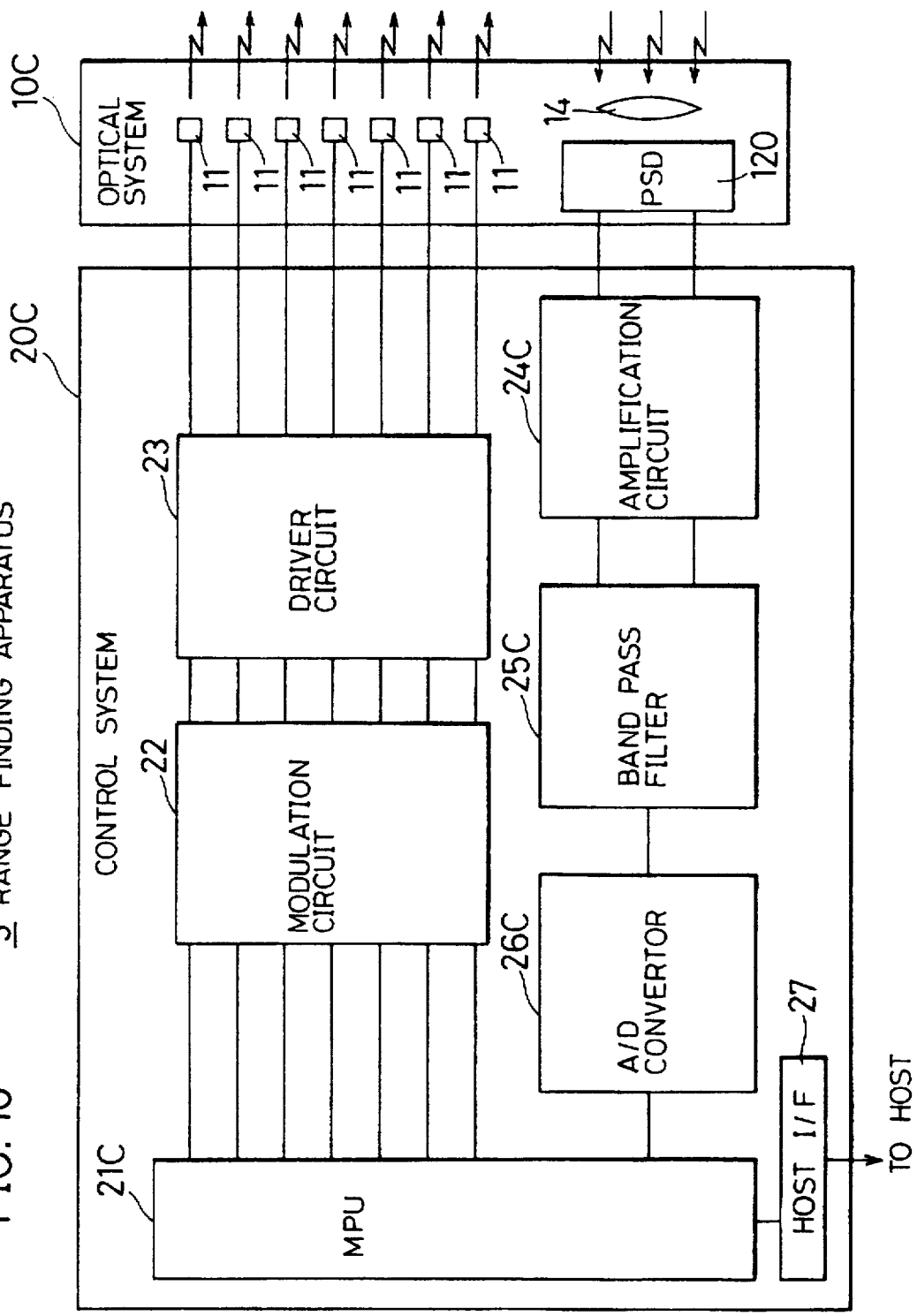
FIG. 10 is a block diagram illustrating the functional construction of a range finding apparatus in accordance with a third embodiment of the present invention.
Figure 11:
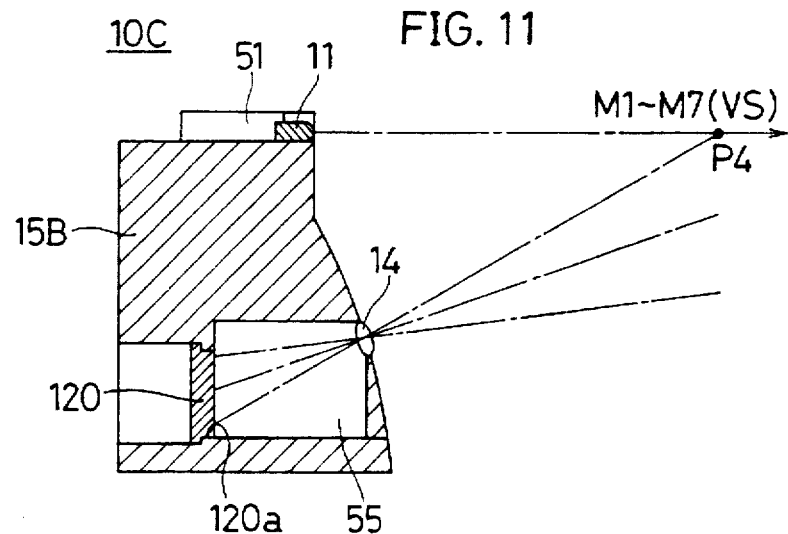
FIG. 11 is a sectional view illustrating the construction of an optical system of FIG. 10.

FIG. 10 is a block diagram illustrating the functional construction of a range finding apparatus 3 in accordance with a third embodiment. FIG. 11 is a sectional view illustrating the construction of an optical system 10C of FIG. 10.

The range finding apparatus 3 comprises the optical system 10C and a control system 20C.

The optical system 10C includes seven photoprojectors 11 provided in one-to-one correspondence with seven range-finding axes M1 to M7 extending radially in a virtual plane VS, a position sensitive device 120 of position detective type (hereinafter referred to as "PSD") serving as common photoelectric conversion means for the seven photoprojectors 11, and seven lenses 14 serving as light reception field limitation means and provided in one-to-one correspondence with the range-finding axes M1 to M7. The lenses 14 are disposed in substantially the same positions as in the aforesaid range finding apparatus 2.

The PSD 120 is a relatively large photodetector having a light receiving surface 120a with a vertical length of 6 mm, and is disposed on the rear side of a cavity 55, as shown in FIG. 11. Light detection axes of the PSD 120 extend within a vertical plane. That is, the PSD 120 outputs a signal according to an incident light amount distribution within a plane perpendicular to the virtual plane VS. The control system 20C includes an MPU 21C functioning as range-finding axis switching means, a modulation circuit 22 for flashing detection light, a driver circuit 23 for supplying driving current to the respective photoprojectors 11, an amplification circuit 24C for amplifying received-light signals from the PSD 120, an arithmetic circuit 25C for outputting the received-light signals as light reception position information, an A/D convertor 26C for quantifying the light reception position information, and a host interface 27.

The MPU 21C successively selects the seven photoprojectors 11 one by one and allows the respective photoprojectors 11 to emit detection light along the rangefinding axes M1 to M7 in a time-divisional manner. If there exists an object on the range-finding axes M1 to M7, the detection light is irregularly reflected on the surface of the object, and some of the reflected light returns to the side of the PSD 120.

The PSD 120 is spaced apart from the virtual plane VS, and the light reception field thereof is limited by the lenses 14. Therefore, the detection light reflected at a point P4 located relatively close to a photoprojector 11 on the optical axis of the photoprojector 11 enters a lower portion of the light receiving surface 120a of the PSD 120. The detection light reflected at a position more remote from the photoprojector 11 than the point P4 enters a vertically middle portion of the light receiving surface of the PSD 120. The detection light reflected at a position still more remote from the photoprojector 11 enters an upper portion of the light receiving surface 120a of the PSD 120.

Therefore, the distance to the object can be determined on the basis of which portion of the light receiving surface of the PSD 120 receives the detection light, while the azimuth of the object can be determined on the basis of which of the seven photoprojectors 12 is selected to be allowed to emit light at this time. By using the PSD 120, the range finding can be highly accurately performed within a predetermined range-finding field in a stepless manner.

In accordance with the first and second embodiments, the range finding along seven different range-finding axes can be realized by using seven photoprojectors 11 and five or three photodetectors 12. Thus, the number of photodetectors can be reduced in comparison with the conventional range-finding apparatus which employs seven range-finding devices (seven photoprojector/photodetector pairs) oriented in different directions. Further, since the photodetectors 12 are arranged within the plane perpendicular to the virtual plane VS, the the optical systems 10 and 10B have reduced sizes.

Where seven photodetectors and five photoprojectors are employed which are provided in the positions of the seven photoprojectors 11 and the five photodetectors 12, respectively, range finding with substantially the same resolution as in the aforesaid embodiments can be realized. In accordance with the aforesaid embodiments, however, the number of components for light reception which requires a complicated signal processing is smaller than the number of components for light projection and, hence, the circuit construction of the control system 20 can be simplified.

In accordance with the embodiment shown in FIG. 2, the light reception fields are limited by the slits 13 formed in the block 15. Therefore, the optical system 10 has a reduced number of components and simplified construction in comparison with a case where special optical components are employed, thereby reducing the cost of the range finding apparatus 1.

Figure 12B:
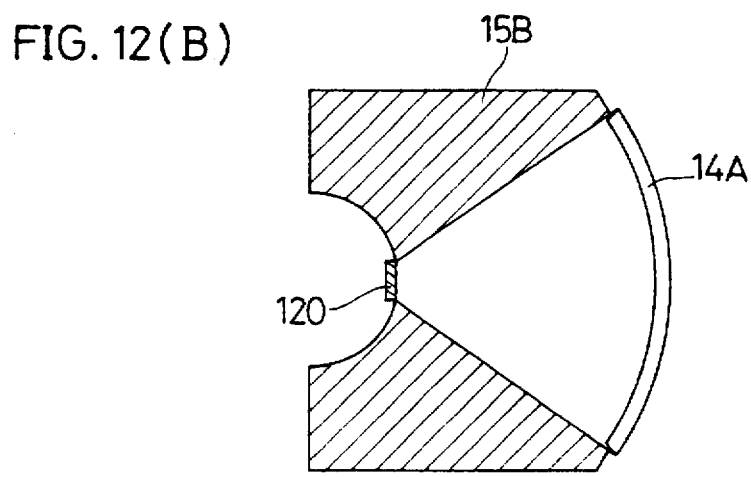
FIG. 12(B) is a sectional view illustrating the modification of the optical system according to the third embodiment.
Figure 12A:
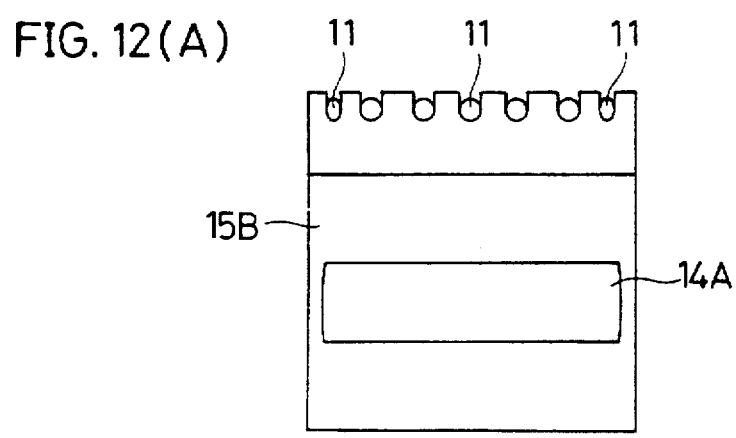
FIG. 12(A) is a front view illustrating a modification of the optical system according to the third embodiment.

In the embodiment shown in FIG. 11, a single toroidal lens 14A may be provided as shown in FIGS. 12(A) and 12(B) instead of the seven lenses 14.

In accordance with the embodiments shown in FIGS. 7 and 11, the light reception fields are limited by the lenses 14 provided in the block 15B and, therefore, flexible light path arrangement can be realized by proper design of the lenses 14. Thus, the size of the block 15B can be reduced in comparison with a case where slits are used to limit the light reception fields.

In accordance with the embodiment shown in FIG. 7, the microphone 30 is provided in a space which is inevitably formed between the photoprojectors 11 and the photodetectors 12 by spacing the photodetectors 12 apart from the virtual plane VS and, therefore, the provision of the microphone 30 does not entail an increase in the size of the block 15B. Thus, a compact and multi-functional range-finding apparatus can be provided which has a voice detecting function.

Though discrete components such as phototransistor are used as the photodetectors 12 in the embodiments shown in FIGS. 1 to 9, an image pickup device such as CCD array having multiple integrated light receiving elements may be employed as common photoelectric conversion means for all the photoprojectors 11 to improve a range-finding resolution. In such a case, the individual light receiving elements serve as the photodetectors according to the present invention.

In the aforesaid embodiments, the amounts of light to be emitted by the seven photoprojectors 11 are properly adjusted depending on the characteristics of light incident angle sensitivity (directivity) of the photodetectors 12 so as not to produce a difference in the photoelectric conversion outputs which may result from different directivities of the range-finding axes M1 to M7. Thus, more accurate range finding can easily be realized.

In the aforesaid embodiments, the range-finding axes M1 to M7 may be arranged within a horizontal plane, a plane inclined at an angle of elevation with respect to the virtual view point, or a plane inclined at an angle of depression with respect to the virtual view point, and may be optimized according to the positional relation between the optical system 10, 10B or 10C and an object.

In the aforesaid embodiments, various modifications may be made to the construction of the optical system 10, 10B or 10C (e.g., the number of the range-finding axes (resolution), the number of the photodetectors 12, the constructions of the photoprojectors 11 and photodetectors 12, and material and configuration of the block 15 or 15B) and the circuit construction of the control system 20, 20B or 20C. For example, the M photoprojectors 11 may be arranged in a line and allowed to assume different orientations, and the N photodetectors 12 may be aligned generally parallel to the virtual plane VS.

The range finding apparatuses of the first to third embodiments apparatuses, though having simple constructions, can realize the measurement of a distance to an object in a two-dimensional field.

Figure 13:
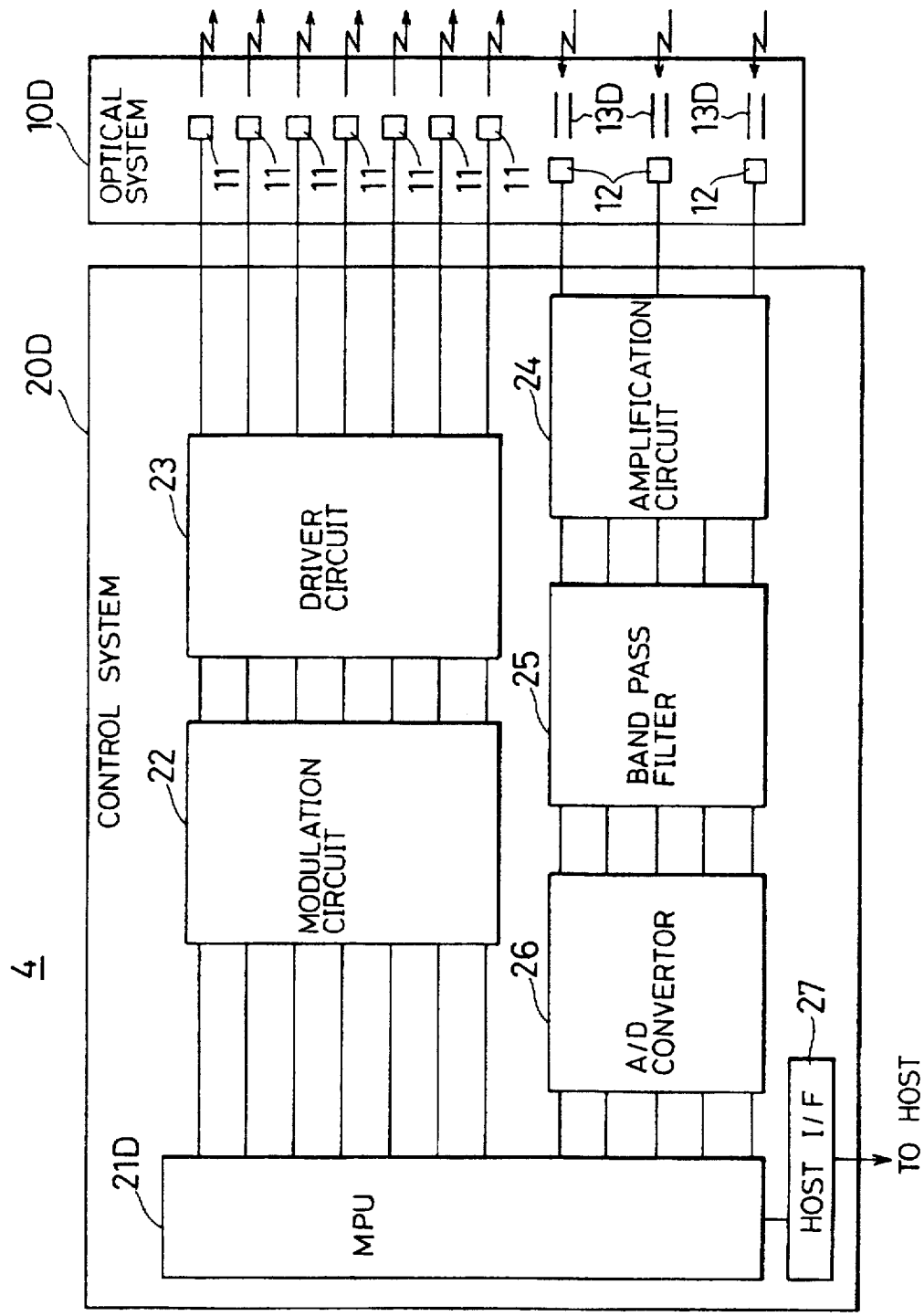
FIG. 13 is a block diagram illustrating the functional construction of a range finding apparatus in accordance with a fourth embodiment of the present invention.

FIG. 13 is a block diagram illustrating the functional construction of a range finding apparatus 4 in accordance with a fourth embodiment of the present invention.

The range finding apparatus 4 includes an optical system 10D for emitting detection light and outputting a photoelectric signal in accordance with a distance to an object, and a control system 20D for controlling light projection by the optical system 10D and processing the photoelectric signal. The range finding apparatus 4 is used, for example, as visual information inputting means for an object recognition system.

The optical system 10D has seven photoprojectors 11, three photodetectors 12, and slits 13D serving as optical means for limiting the light reception fields of the photodetectors 12. The photoprojectors 11 each comprise an infrared light emitting diode and a condenser lens. The photodetectors 12 each comprise a focusing lens and a phototransistor.

The control system 20D includes a microprocessor unit (MPU) 21D, a modulation circuit 22 for flashing the detection light at a frequency of about 40 kHz, a driver circuit 23 for supplying driving current to the respective photoprojectors 11, an amplification circuit 24 for amplifying an output (received-light signal) of each of the photodetectors 12, a band-pass filter 25 for extracting a modulated component corresponding to the detection light from the amplified received-light signal, an A/D convertor 26 for quantifying the extracted modulated component, and a host interface 27 for sending a range finding result to external visual information processing means (host) such as a personal computer.

The MPU 21D serves as range-finding axis switching means for successively and selectively allowing the respective photoprojectors 11 to emit light and as distance determination means for determining a distance to an object by comparing values output from the respective photodetectors 12. The MPU 21D also serves as light emission amount control means for collectively or selectively changing the light emission of the photoprojectors 11. The MPU 21D, the construction of which is not shown, comprises a CPU for running programs, an ROM storing therein the programs, reference data for distance determination (which will be described later) and the like, an RAM for providing a work area for program implementation, and I/O ports.

Figure 14:
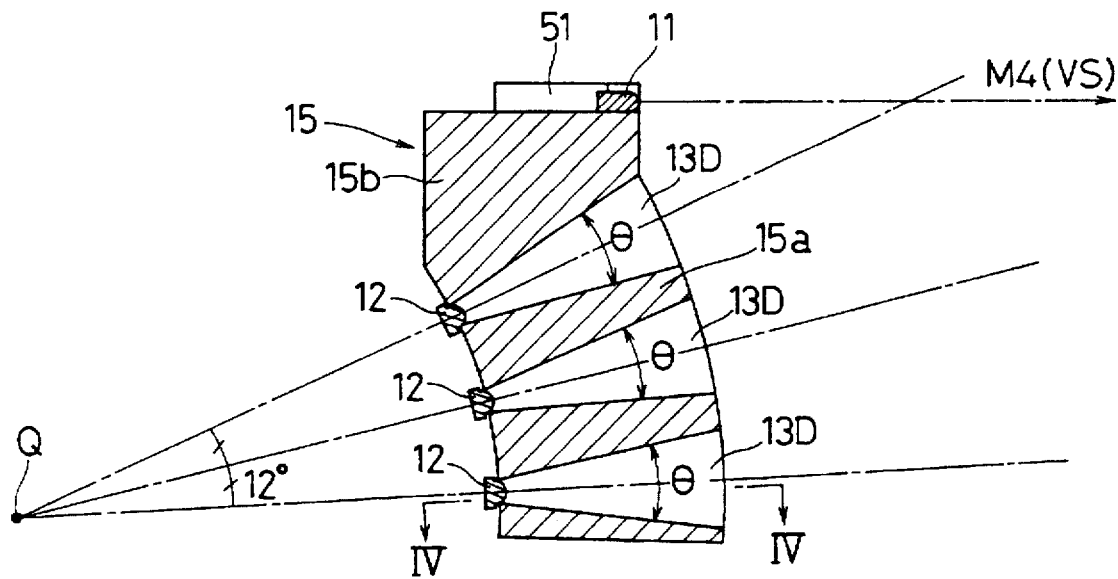
FIG. 14 is a sectional view illustrating the optical system according to the fourth embodiment.

The optical system 10D has substantially the same construction as that of the first embodiment shown in FIGS. 2(A) and 2(B), which includes a block 15 formed of a black resin as a base body. In this embodiment, three slits 13d and three photodetectors 11 are provided in the block 15a as shown in FIG. 14.

The three slits 13D are respectively formed along three axes spaced, for example, at intervals of 12° and radially extending with respect to a virtual point Q. Further, the slits 13D each have an aperture angle θ (see FIG. 14) larger than that in the first embodiment. Except these features, the optical system 10D according to this embodiment is substantially the same as the optical system 10 (the first embodiment).

In the range finding apparatus 4, like the first embodiment, the front faces (or light receiving axes) of the respective photodetectors 12 are inclined at different angles with respect to the virtual plane VS and, therefore, the relation between an object distance (a distance between the range finding apparatus 4 and an object present in front thereof) and a received light amount (the amount of detection light entering a photodetector 12) varies with the location of the photodetector 12. The light reception fields of the respective photodetectors 12 are limited by the slits 13D so that only light reflected on the object in a range-finding field extending forward along the range-finding axes M1 to M7 and travelling toward the range finding apparatus 4 enters the photodetectors 12. Since the slits 13D differ in configuration from the slits 13 as shown in FIG. 14, the light reception fields (or view fields) of the respective photodetectors 12 overlap each other in the range-finding field extending along the rangefinding axes M1 and M7.

Figure 15A:
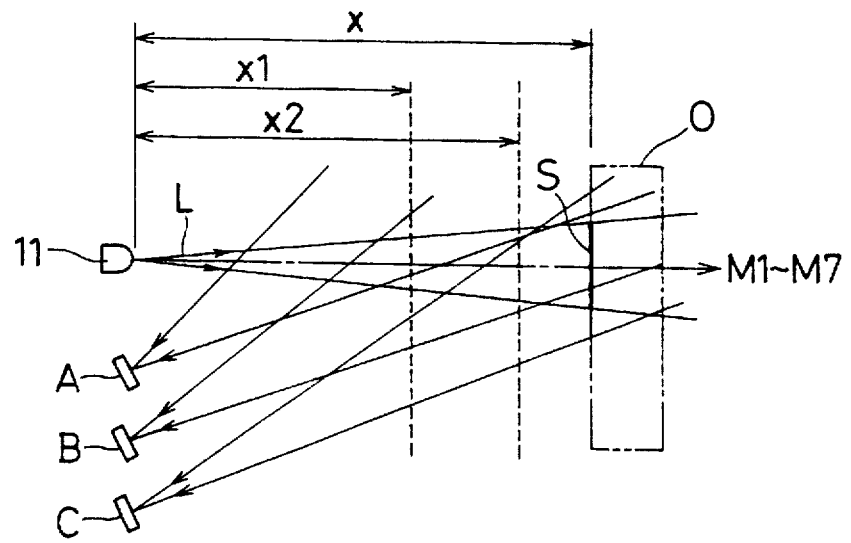
FIG. 15(a) is diagram for explaining the principle of the range finding according to the fourth embodiment.

The MPU 21D in the control system 20D successively selects the seven photoprojectors 11 one by one to allow the respective photoprojectors 11 to emit light along the range finding axes in a time-divisional manner. The detection light is projected as conical beams with the center axes thereof coinciding with the range finding axes M1 to M7 as shown in FIG. 15(a). If there exists an object O (such as a human body) within a detection light projection field, the detection light is irregularly reflected on the surface S of the object O, and some of the detection light returns to the side of the photodetectors 12. It is herein assumed that the photodetectors 12 at the uppermost position, the middle position and the lowermost position are referred to as photodetectors A, B and C, respectively.

Figure 15B:
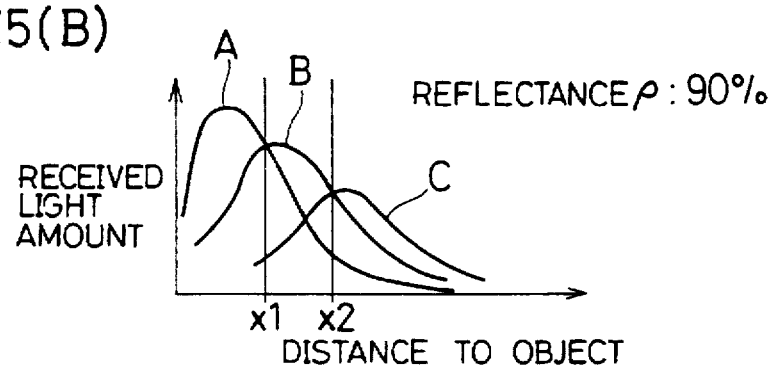
FIGS. 15(b) and 15(c) are graphical representations illustrating the relationship between the object distance and the received light amount for two different reflectances in accordance with the fourth embodiment.
Figure 15C:
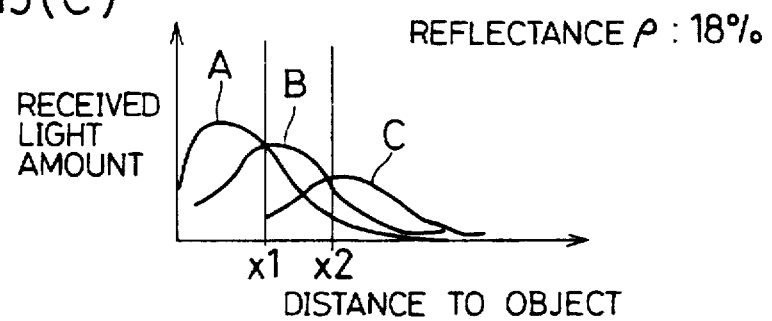

The respective photodetectors A, B and C are spaced apart from the virtual plane VS (including the optical axes of the photoprojectors 11), and inclined at different angles with respect to the virtual plane VS. More specifically, the cross angle of the light reception axis of the photodetector A at the uppermost position with respect to the virtual plane VS is the largest (acute angle), and the cross angles of the light reception axes of the photodetectors B and C at the lower positions are smaller. Therefore, even if the view fields of the photodetectors A, B and C overlap each other, the relation between the object distance and the received light amount varies with the location of the photodetector A, B or C. However, the comparative relation among the received light amounts of the three photodetectors A, B and C is generally the same as shown in FIGS. 15(a) and 15(b), if an object is located a given distance apart from the range finding apparatus 4 within an effective range-finding field where the photodetectors can each receive an effective amount of light reflected on the object. More specifically, the comparative relation among the received light amounts of the photodetectors A, B and C does not change whether the object has a surface with a low reflectance ρ (e.g., gray clothes with a reflectance of 18%, see FIG. 15(c)) or has a surface with a high reflectance ρ (e.g., white clothes with a reflectance of 90%, see FIG. 15(b)). This is because the total amounts of light received by the respective photodetectors A, B and C change depending on the reflectance ρ, but the angles of light reflection on the object are not significantly influenced by the reflectance.

Therefore, if the comparative relations among the received light amounts of the photodetectors A, B and C are preliminarily determined for various object distances, and data indicative of the results are stored in the MPU 21D, the distance to an object can be determined by determining the comparative relation among the amounts of light received by the three photodetectors A, B and C. The azimuth of the object can be determined on the basis of which of the seven photoprojectors 11 is selected to be allowed to emit light when at least one photodetector receives the detection light.

The MPU 21D takes in the outputs (received light amounts) of the three photodetectors A, B and C quantified by the A/D convertor 26 to determine the object distance, and sends the determination result along with the data indicative of a range-finding direction to the host via the host interface 27. This process sequence is repeated, for example, in a cycle of 100 ms. The host recognizes the movement of the object on the basis of the data successively input thereto.

Next, a more detailed explanation will be given to the object distance determination process to be performed by the MPU 21D.

Figure 16:
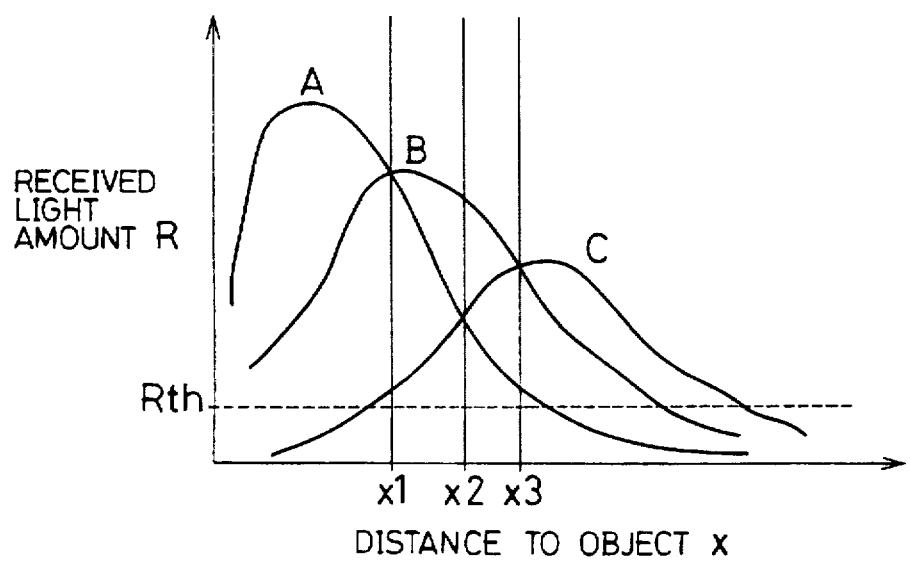
FIG. 16 is a graphical representation illustrating one exemplary relation between the object distance and the received light amount.

FIG. 16 is a graphical representation illustrating one exemplary relation between the object distance x and the received light amount R, and FIG. 17 is a flow chart for illustrating the method for determining the object distance.

As indicated by light reception characteristic curves in FIG. 16, the received light amounts R of the respective photodetectors A to C vary depending on the object distance x. In the example of FIG. 16, the received light amounts R of the photodetectors A and B are the same at an object distance x1, the received light amounts of the photodetectors A and C are the same at an object distance x2, and the received light amounts of the photodetectors B and C are the same at an object distance x3. The relationship between the object distance range and the comparative relation among the received light amounts of the respective photodetectors A to C is shown in Table 1 (in which the object distances x1, x2 and x3 are used as range limits).

TABLE 1

| Distance range | Comparative relation among received light amounts of photodetectors A, B and C |
|---|---|
| 0 < x < x1 | A > B > C |
| x1 < x < x2 | B > A > C |
| x2 < x < x3 | B > C > A |
| x3 < x | C > B > A |

Reference data for distance determination as shown in Table 1 are stored in the ROM incorporated in the MPU 21D. Every time the photoprojectors are selectively allowed to emit light, the MPU 21D takes in the received light amounts R of the photodetectors A to C, and compares the values thereof with each other. The MPU 21D determines the object distance x by matching the comparison result with the reference data for distance determination.

Referring to FIG. 17, in the distance determination process, it is checked if two or more of the three photodetectors A to C have received light in an amount not less than a threshold Rth (Step #1). The threshold Rth is provided to eliminate the influences of an electrical drift of the detection system and noise light reflected on objects (e.g., wall and ceiling) other than the object to be targeted for range finding.

If there are two or more photodetectors which have received light in an amount not less than the threshold, it is checked if the received light amount R of the photodetector A is the greatest (Step #2). If YES, it is determined that the object distance x is less than x1 (Step #3). If NO, it is checked if the received light amount R of the photodetector B is the greatest (Step #4). If the received light amount R of the photodetector B is not the greatest, the received light amount R of the photodetector C is the greatest. In this case, it is determined that the object distance x is greater than x3 (Step #10).

If the received light amount R of the photodetector B is the greatest, it is checked if the received light amount R of the photodetector A is the second greatest (Step #5). If YES, it is determined that the object distance x is greater than x1 and less than x2. If NO, it is determined that the object distance x is greater than x2 and less than x3.

On the other hand, if NO in Step #1, it is checked if there is one photodetector or no photodetector which has received light in an amount not less than the threshold Rth (Step #8). If one, it is checked which photodetector A or C is that particular photodetector (Step #9). If the photodetector A is the particular one, the received light amount R of the photodetector A is the greatest, and it is determined that the object distance x is less than x1 (Step #3). If the photodetector C is the particular one, it is determined that the object distance x is greater than x3 (Step #10).

If NO in Step #8, i.e., if all the received light amounts R of the photodetectors A to C are less than Rth, it is determined that there exists no object in the view field (the object distance x is infinite) (Step #11).

Figure 18:
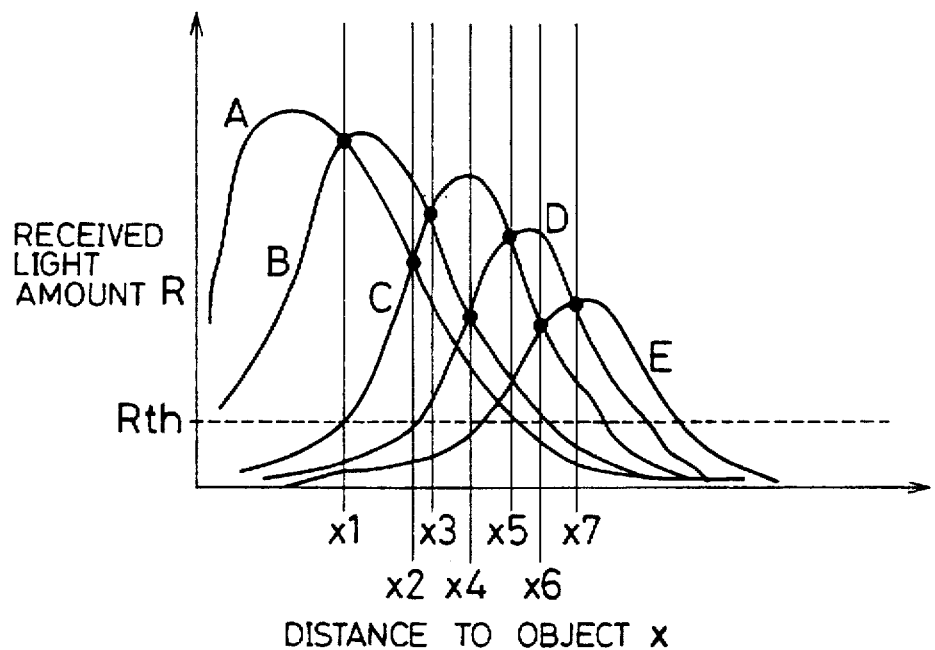
FIG. 18 is a graphical representation illustrating another exemplary relation between the object distance and the received light amount.

FIG. 18 is a graphical representation illustrating another exemplary relation between the object distance x and the received light amount R in a case where five photodetectors A to E vertically disposed from the uppermost position to the lowermost position are employed for the range finding.

In the example of FIG. 18, object distances x are classified into eight distance ranges with object distances x1 to x7 used as range limits. The relationship between the object distance range and the comparative relation among the received light amounts R of the respective photodetectors A to E is shown in Table 2.

TABLE 2

| Distance range | Comparative relation among received light amounts of photodetectors A to E |
|---|---|
| 0 < x < x1 | A > (B, C, D, E) |
| x1 < x < x2 | B > A > (C, D, E) |
| x2 < x < x3 | B > C > (A, D, E) |
| x3 < x < x4 | C > B > (A, D, E) |
| x4 < x < x5 | C > D > (A, B, E) |
| x5 < x < x6 | D > C > (A, B, E) |
| x6 < x < x7 | D > E > (A, B, C) |
| x7 < x | E > (A, B, C, D) |

In this case, like the example described above, every time the photoprojectors are selectively allowed to emit light, the MPU 21D takes in the received light amounts R of the photodetectors A to E, and compares the values thereof with each other. The MPU 21D determines the object distance x by matching the comparison result with the reference data for distance determination. For example, if the comparative relation among the received light amounts R of the photodetectors A to E is A>(B, C, D, E), i.e., if the received light amount R of the photodetector A is the greatest, it is determined that the object distance x is less than x1. If B>A>(C, D, E), i.e., if the received light amount R of the photodetector B is the greatest and the received light amount R of the photodetector A is the second greatest, the object distance x is greater than x1 and less than x2.

In the aforesaid example, only adjacent three (ABC, BCD, CDE) of the seven photodetectors A to E are taken into consideration, and the object distance x is virtually determined on the basis of the comparative relation among the received light amounts R of the three adjacent photodetectors. The object distance x may be determined more precisely on the basis of the comparative relation among the received light amounts R of four or more adjacent photodetectors.

If the number of photodetectors to be employed is J (J>3) and the values of object distances at intersections of the light reception characteristic curves of every l photodetectors (J−2>l>0) are regarded as range limits, the number of range limits is j(j−1)/2 at maximum. More specifically, the range finding apparatus 4 can determine an object distance x in a distance range between zero and infinite point with a resolution of j(j−1)/2+1. The number of available distance range limits (values of object distances at intersections of the light reception characteristic curves) depends on whether a sufficient amount of light reflection can be obtained in a predetermined range of surface reflectance p of an object to be targeted for range finding and whether the light reception field limitation means can be properly adjusted to separate the intersections of the light reception characteristic curves from each other. An exemplary method for adjusting the amounts of reflected light is to control the light projection of the respective photoprojectors 11. This method is advantageous in that the light projection can be appropriately reduced to prevent the photodetectors 12 from being saturated with light when the reflected light amount is extremely great.

Figure 19:
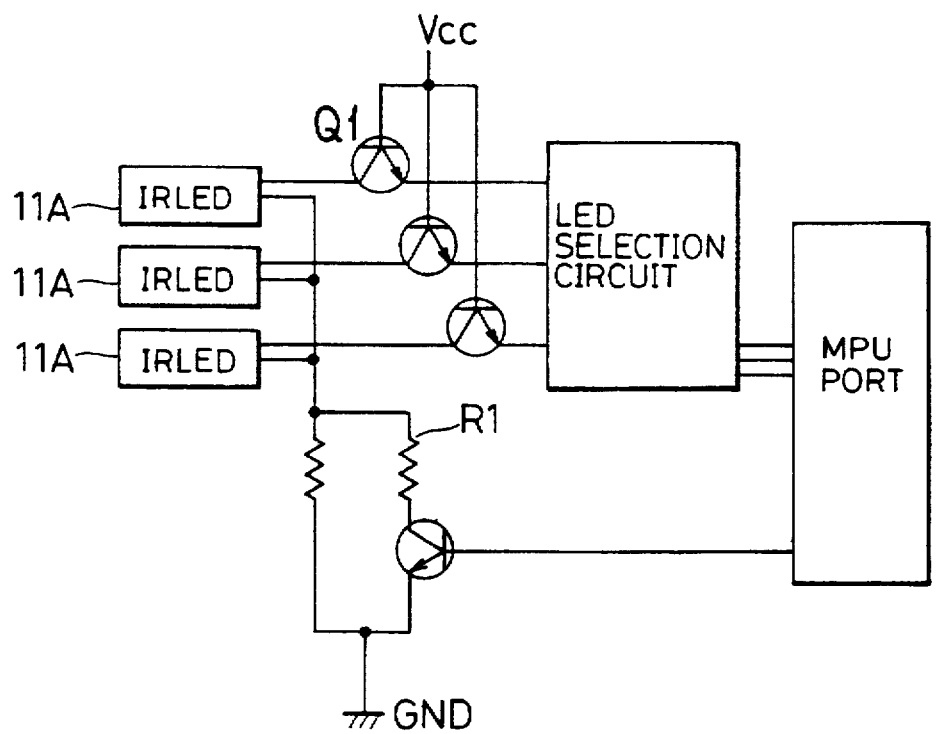
FIG. 19 is a circuit diagram illustrating one exemplary light amount control circuit according to the fourth embodiment.

FIG. 19 is a circuit diagram illustrating one exemplary light amount control circuit.

The light amount control circuit of FIG. 19 is adapted to switch between two levels of driving current to infrared light emitting devices (LED) 11A serving as light sources of the photoprojectors 11 by switching the transistor Q1. The switch levels can be easily increased by providing additional transistors and resistors.

The object distance range can also be determined by determining which of a plurality of photodetectors has received the greatest light amount R. In FIG. 16, for example, if the received light amount R of the photodetector A is the greatest, it is determined that the object distance x is less than x1. If the received light amount R of the photodetector B is the greatest, it is determined that the object distance x is greater than x1 and less than x3. If the received light amount R of the photodetector C is the greatest, it is determined that the object distance x is greater than x3.

In the fourth embodiment, like the other embodiments, the range-finding axes M1 to M7 may be arranged within a horizontal plane, a plane inclined at an angle of elevation with respect to the virtual view point, or a plane inclined at an angle of depression with respect to the virtual view point, and may be optimized according to the positional relation between the optical system 10 and an object. Further, the photodetectors may be disposed above the photoprojectors 11. The relationship between the object distance x and the received light amount R (light reception characteristics) can be optimized by properly changing the shape and dimensions of the slits 13 and the positional relation between the photodetectors 12 and the virtual plane VS.

In the fourth embodiment, various modifications may be made to the construction of the optical system 10 (e.g., the number of the range-finding axes (resolution), the number of the photodetectors 12, the constructions of the photoprojectors 11 and photodetectors 12, and material and configuration of the block 15) and the circuit construction of the control system 20D. For example, the light reception fields of the photodetectors 12 may be limited by lenses having a predetermined configuration such as arcuate shape. The M photoprojectors 11 may be arranged in a line and allowed to assume different orientations, and the N photodetectors 12 may be aligned generally parallel to the virtual plane VS.

In accordance with the fourth embodiment, the object distance is determined on the basis of the comparative relation among the received light amounts of a plurality of photodetectors. Therefore, there is no need to eliminate the overlap of the light reception fields of the respective photodetectors, unlike a case where the object distance is determined on the basis of whether each photodetector has received light or not. Therefore, the construction of the optical system can be simplified, and yet the range finding will not be influenced by the reflectance of an object. Further, blind spots within the effective range-finding field can be eliminated by overlapping the light reception fields of the photodetectors.

What is claimed is:

1. A range finding apparatus comprising:
   a plurality of photoprojectors, provided in one-to-one correspondence with range finding axes radially extending at different angles from each other within a virtual plane for forwardly projecting detector right along the range finding axes;
   a one-dimensional light detecting device spaced apart from the virtual plane and having light detecting portions, said device serving as a common photoelectric conversion means for the photoprojectors;
   light directing means for directing the detection light from the plurality of the photoprojectors reflected from an object to the one-dimensional light detecting device;
   range finding axis switching means for selectively allowing the photoprojectors to emit the detection light; and
   distance determination means for determining a distance to an object based on which specific photoprojector is currently emitting the detection light and based on which specific light detecting portion is receiving the detection light reflected from the object.

2. A range finding apparatus as set forth in claim 1, wherein the light detecting portions are arranged within a plane perpendicular to the virtual plane.

3. A range finding apparatus as set forth in claim 1, wherein the light directing means includes light reception field limitation means for allowing the light detecting portions to selectively receive detection light reflected at different points on optical axes of the photoprojectors in a range finding field plane perpendicular to the virtual plane extending along the range finding axes.

4. A range finding apparatus as set forth in claim 3, wherein the light reception field limitation means comprises slits.

5. A range finding apparatus as set forth in claim 3, wherein the light reception field limitation means comprises lenses provided within a plane parallel to the virtual plane.

6. A range finding apparatus as set forth in claim 3, wherein the light reception field limitation means comprises a single toroidal lens.

7. A range finding apparatus as set forth in claim 1, wherein the light detecting device comprises a position sensitive device, which outputs signals according to an incident light amount distribution within a plane perpendicular to the virtual plane and including the light detection axes of the light detecting portions.

8. A range finding apparatus as set forth in claim 1, wherein the distance determination means compares detection values output from the light detection portions to determine a comparative relation among the detection values, and determines a distance to an object by selecting one distance range corresponding to the comparative relation from a plurality of distance ranges preliminarily stored in one-to-one correspondence with various comparative relations amount detection values.

9. A range finding apparatus as set forth in claim 8, wherein the distance determination means adopts a detection value not less than a threshold as an effective value, and regards a detection value less than the threshold as zero.

10. A range finding apparatus as set forth in claim 8, further comprising:

light projection control means for changing the amount of light to be projected by each of the photoprojectors.

11. A range finding apparatus as set forth in claim 1, further comprising voice detection means for detecting a voice from the object and wherein said distance determination means determines a distance based also on detection of the voice from the object.

12. A range finding apparatus as set forth in claim 1, wherein the photoprojectors are larger than the light detecting portions in number.

13. A range finding apparatus as set forth in claim 1, wherein the light detecting portions of the light detecting device include at least one of phototransistors and photodiodes arranged in a single plane perpendicular to the virtual plane of the photoprojectors.

14. A range finding apparatus, comprising:

a plurality of photoprojectors disposed in a horizontal plane, each of the photoprojectors directing a detection light outward along range finding axes, each of the range finding axes extending at different angles from each other;

a one-dimensional light detecting device, spaced apart from the horizontal plane of said photoprojectors, having light detecting portions disposed in a single plane perpendicular to the horizontal plane of said photoprojectors, for detecting the detection light reflected from an object;

light directing means for directing the detection light from the plurality of photoprojectors reflected from an object to the one-dimensional light detecting device;

a range finding axes switching device selectively allowing said photoprojectors to emit the detection light; and a distance determining device determining a distance to the object based on the detection light detected by said light detecting portions.

15. A range finding apparatus as set forth in claim 14, wherein the light detecting portions of the light detecting device include at least one of phototransistors and photodiodes.

16. A range finding apparatus, comprising:

a plurality of photoprojectors disposed in a horizontal plane, each of the photoprojectors directing a detection light outward along range finding axes, each of the range finding axes extending at different angles from each other;

a one-dimensional light detecting device, spaced apart from the horizontal plane of said photoprojectors, having light detecting portions disposed in a single plane perpendicular to the horizontal plane of said photoprojectors, for detecting the detection light reflected from an object;

means for selectively allowing said light detecting portions to receive the detection light from the plurality of photoprojectors reflected from the object at different positions in range finding planes corresponding to the range finding axes perpendicular to the horizontal plane of said photoprojectors;

a range finding axes switching device selectively allowing said photoprojectors to emit the detection light; and a distance determining device determining a distance to the object based on the detection light detected by said light detecting portions.

17. A range finding apparatus as set forth in claim 16, wherein the light detecting portions of the light detecting device include at least one of phototransistors and photodiodes.

* * * * *